May 26, 1959     R. G. HOFT ET AL     2,888,645
VOLTAGE REFERENCE LEVEL VARIANCE INDICATOR
Filed Nov. 14, 1956     2 Sheets-Sheet 1
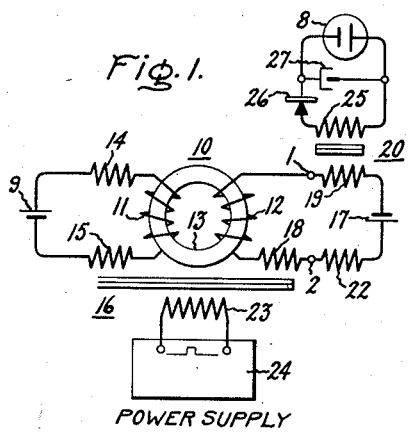
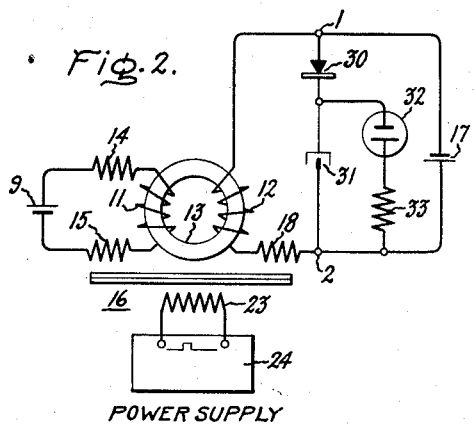
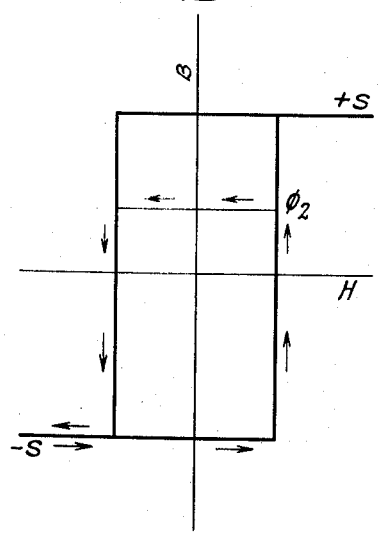
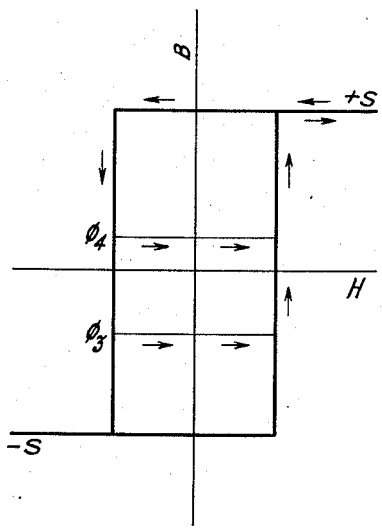
Inventors:
Richard G. Hoft,
Earl L. Phillipi,
by Merton D. Morse
Their Attorney.

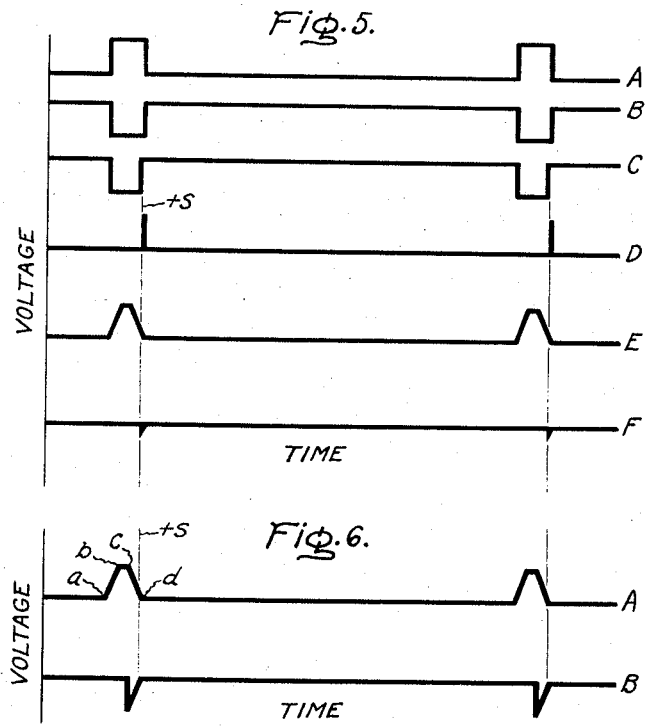
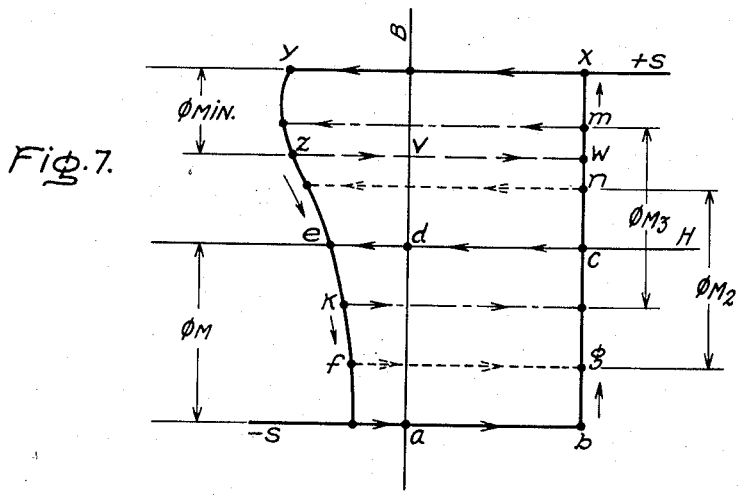

Unites States Patent Office 2,888,645
Patented May 26, 1959

2,888,645

VOLTAGE REFERENCE LEVEL VARIANCE INDICATOR

Richard G. Hoft and Earl L. Phillipi, Schenectady, N.Y., assignors to General Electric Company, a corporation of New York Application November 14, 1956, Serial No. 622,068

9 Claims. (Cl. 324—117)

The present invention is directed to an improvement in indicators which will indicate whether or not a particular voltage is below a given reference level. More particularly, the invention relates to such a device which utilizes a saturable core impedance device.

The indicator disclosed herein may be utilized for indicating an under voltage or an over voltage condition, comparing two voltages to determine when they are equal, as an over voltage relay indicating device, or as a low or high temperature indicator (if used with thermocouple input).

When utilizing a single electric storage battery or a bank of batteries it is desirable to have an indication of a low voltage condition from each battery cell and it may be desirable in many instances to have a means of continuously monitoring the voltage from each cell. Also, when recharging a storage battery it is desirable to have a means to indicate when the charging voltage is above the charging level desired. Although the invention is not so limited, it is described in conjunction with this low or high voltage indicator application.

Circuitry which has been developed for the above mentioned purpose is shown, described, and claimed in the application of Jerry L. Stratton entitled "Voltage Reference Level Variance Indicator" filed September 28, 1956, given Serial Number 612,709, now Patent No. 2,856,584, and assigned to the assignee of the present invention. The present invention is directed specifically to improving the performance and increasing the sensitivity of the circuitry disclosed in the above mentioned Stratton application.

In accordance with the indicator disclosed in the Stratton application, a single core saturable impedance device is provided with two windings, one of which is energized by a reference voltage and the other one of which is energized from the source being monitored. Thus, the degree of magnetization of the core is determined by the relative magnitude of the reference and monitored voltage sources. In order to ascertain the degree of magnetization of the core, and consequently the relationship of the two voltage sources, means is provided to supply both windings with a voltage pulse at regular intervals. As long as the reference and monitored voltage sources have a desired relationship the core of the saturable impedance device remains unsaturated and the voltage across the windings will be equal in magnitude and of polarity opposite to that of the applied voltage pulse.

If, however, the relationship of the monitored and the reference voltage sources changes by a sufficient amount, the core member becomes saturated and the impedance of the two windings becomes essentially zero. Thus, the voltage developed across the two windings will not be equal to the voltage pulse introduced into this circuit and the difference voltage; i.e., the difference between the voltage pulse introduced into the circuit and the voltage developed across one of the windings, may then be utilized to operate an indicator.

If the hysteresis loop of the saturable core member of the saturable impedance device is square and if the voltage pulses supplied to the circuit of the reference and test windings is of a perfect square pulse form; i.e. having perfectly vertical sides, the circuits can be made to go from zero voltage output to peak voltage output in response to an infinitesimally small change in the voltage relationship between the reference and tested source. However, it is extremely difficult to provide the perfectly square voltage pulse and the sides of such pulses almost invariably have some slope. If the sides of the voltage pulses are not vertical, the circuitry just described will not go from full off (zero output) to full output when using a core material having a square loop but the peak voltage outputs will be approximately proportional to the difference in voltage between the reference and test voltage sources (for example, proportional to the drop in battery cell voltage for the cell under test). This phenomenon is explained in more detail subsequently. However, it will readily be seen that for very small drops in battery cell voltage it will be difficult to obtain an output of the circuit which can be utilized to operate a relay or an indicator of any kind unless the circuit gain is very high. It will also be understood that the circuitry necessary to provide a perfectly square voltage pulse is so complex and expensive as to make its use impractical for most applications.

Accordingly, it is an object of this invention to provide a device of high sensitivity which will indicate either when a given voltage drops below a selected reference level or when the given voltage rises above the given reference level.

A further object of this invention is to provide a device of the character referred to which utilizes a magnetic core member characterized by the fact that more exciting current is required to drive the flux level of the core toward negative saturation when operating at positive saturation than at any other point of operation; i.e., a core member having a hysteresis loop with a re-entrant back side.

Briefly stated in accordance with this invention, a magnetic core member is magnetized in accordance with the differential between a reference voltage source and a voltage source which is to be monitored and the degree of magnetization of the core member and, consequently, the relationship of the two voltage sources is ascertained by subjecting the circuits of the two voltage sources to a voltage pulse at regular intervals. In order to provide a maximum sensitivity and snap action of the circuit, as is described in more detail subsequently, the core member utilized is one having special characteristics wherein more exciting current is required to drive the flux level in the core toward negative saturation when the core is at positive saturation than for any other condition of operation. In other words, the operating hysteresis loop of the core material is wider across the top than at the bottom.

The novel features which are believed to be characteristic of this invention are set forth with particularity in the appended claims. The invention itself, however, both as to its organization and method of operation together with further objects and advantages thereof may best be understood by reference to the following description taken in connection with the accompanying drawings in which:

Figures 1 and 2 illustrate schematic diagrams of circuitry and apparatus which utilize the present invention;

Figures 3 and 4 show idealized hysteresis loops utilized in explaining the operation of the apparatus of Figures 1 and 2;

Figure 5 illustrates various wave shapes utilized in explaining the operation of the circuits of Figures 1 and 2;

Figure 6 illustrates wave shapes utilized in explaining the operation of the apparatus of Figures 1 and 2 wherein the magnetic core members utilized have the characteristics illustrated in Figure 7; and Figure 7 illustrates a dynamic hysteresis loop which has the characteristics which are utilized in the present invention exaggerated in order to explain the principles involved.

Referring specifically to Figure 1 of the drawing, a simplified circuit diagram is provided showing the main elements of one embodiment of a single voltage monitoring system. The system illustrated may be duplicated for each voltage to be monitored. For example, if the system is used to monitor the voltage of each cell of a 252 cell electric storage battery, 252 of the individual systems illustrated and described are utilized.

The system which is utilized to monitor the voltage developed by the storage battery cell 9 includes a magnetic amplifier 10 having a pair of magnetizing windings 11 and 12 and core member 13. One of the magnetizing windings 11, which may be called the test or monitoring winding, is connected in a series monitoring circuit which includes a resistor 14 and a secondary winding 15 of a pulse supply transformer 16. This series circuit is connected to receive the voltage of the monitored battery cell 9.

A unidirectional reference voltage is applied to the other magnetizing winding 12 (the reference winding) of the magnetic amplifier 10 by a standard or reference voltage source 17. The series reference circuit includes a primary winding 19 of impedance matching transformer 20, the reference voltage source 17, a resistor 22, a secondary winding 18 of the pulse supply transformer 16, and the reference winding 12. The secondary windings 15 and 18 of the supply transformer 16 are provided as a means of introducing a voltage pulse into each of the circuits just described; i.e., the circuits of the monitoring and reference windings 11 and 12 by connecting transformer primary winding 23 across a conventional pulse power supply 24. As will be described subsequently, the voltage pulses are introduced into the reference and monitoring circuits in order to cause an abrupt change in the impedance of the reference winding 12 of the magnetic amplifier when the core member 13 is saturated thereby to develop an indicating voltage when the voltage of the monitored cell 9 drops below the desired value. This circuit may also be utilized to indicate an over-voltage as will be more fully explained later.

The present invention includes the utilization of a core member 13, which has special characteristics (which characteristics are described in detail subsequently), with the circuit of the type just described to obtain an unexpected snap action of the circuit when the monitored voltage drops below the desired value. The special characteristics of the core permit this snap action without utilizing perfectly square wave pulses. The term "snap action" is used to indicate a non-linear circuit response wherein the non-linearity gives a higher gain than would normally be expected for a given difference voltage between the standard voltage source and the voltage of the monitored cell.

In order to present a complete understanding of the invention, the operation of the circuit is first described in connection with the idealized hysteresis loops of Figures 3 and 4 and, assuming that the pulses applied to ascertain the degree of magnetization of the core member 13 are perfectly square.

A hysteresis loop represents a plot of flux density B (plotted as ordinates) in the core 13 against the external magnetizing force H (plotted as abscissa) applied to the core 13.

In order to simplify the present discussion the hysteresis loop of Figure 3 is assumed to represent both the static and dynamic hysteresis loop of the core material used. The dynamic hysteresis loop represents a plot of the flux density in the core 13 against the external magnetizing force applied to the core when the applied magnetizing force, or core voltage, is varied at a finite speed (the finite speed being the frequency of the reactor power supply 24). The static hysteresis loop represents the plot of the same parameters when the magnetizing force is changed very slowly (so slowly that the eddy current effects are negligible). The points $+S$ and $-S$, respectively, represent positive and negative saturation of the core material; i.e., the points where the magnetizing force may be increased without changing the flux in the core member.

The portion of the hysteresis loop which defines the flux density for any given magnetizing force as the flux level in the core is changed from negative saturation to positive saturation is considered the positive or the front side of the hysteresis loop, and the line which represents the flux density for any given magnetizing force as the flux level in the core member is driven from positive saturation to negative saturation is considered the negative or the back side of the hysteresis loop. For purposes of discussion, the line which represents the flux path for a given magnetizing force where the magnetizing force is driving the core member from positive saturation toward negative saturation without substantially changing the flux level in the core is called the top of the hysteresis loop, and the line which represents the flux path for a given magnetizing force where the magnetizing force is driving the core member from negative saturation toward positive saturation without appreciably changing the flux level in the core is called the bottom of the loop. The entire loop, either dynamic or static, from positive to negative saturation is considered a major loop and any lesser loop within the major loop is a minor loop.

When a unidirectional potential is applied across a winding of a saturable core impedance device and a steady state condition obtained, the magnetizing force and consequently the flux level in the core member, is set by the product of the current through the winding and the number of turns of the winding on the core. When an alternating voltage or a pulsating unidirectional voltage is applied across such a winding the current through the winding does not build up immediately and in most cases the current through the winding changes continuously, consequently, the magnetizing force applied to the core member and the change of the flux $\Delta\phi$ in the core changes accordingly. Since the transient current and ampere turns are difficult to measure and discuss and since the change of flux $\Delta\phi$ in the core caused by the alternating voltage or pulsating unidirectional voltage is equal to the integral of the voltage over the period of time which it is applied, it is more convenient to discuss the magnetizing force in terms of this integral rather than ampere turns. This integral is referred to as the volt-time integral or simply volt-seconds throughout this specification.

Assume that the monitored cell 9 is polarized in such a direction that it produces a magnetizing force in the core member 13 which tends to drive the core towards negative saturation $-S$ and the reference voltage source 17 is polarized in such a direction that it produces a magnetizing force which tends to drive the core member 13 toward positive saturation. If the net differential magnetizing force produced by the two unidirectional sources is toward negative saturation, a steady state flux will be produced in the core member 13 of the magnetic amplifier 10 which will place the operation of the core at some point on the negative or back side of the hysteresis loop. For the present discussion assume that this point of operation is at negative saturation $-S$ (see Figure 3).

Assume now that a unidirectional voltage pulse of the form illustrated by curve A of Figure 5 is induced in the secondary windings 15 by transformer 16, and that the induced voltage is of such a polarity that it is in opposition to the potential of the monitored cell 9. Simultaneously, a similar unidirectional square wave voltage pulse is induced across the transformer secondary winding 18 in the reference circuit which is of a polarity to produce a magnetizing force in the core member 13 which is additive with respect to that produced by the voltage pulse in the test circuit. Thus, the voltage pulses introduced into the test and reference circuits produce volt-seconds which drive the core toward positive saturation +S while the net differential unidirectional magnetizing force tends to drive the core toward negative saturation —S. In other words, the volt-seconds applied by the pulses swings the flux level of the core member 13 toward positive saturation and the net differential unidirectional volt-seconds which occur between positive pulses swings the flux level in the core member toward negative saturation.

The operation of the circuit may be understood by referring to the hysteresis loop of Figure 3 and assuming that the net differential magnetizing force produced by the monitored cell 9 and the standard source 17 is such that the core member 13 is initially at negative saturation —S. Upon the application of the voltage pulses to the monitored and test circuits the operation of the core on the hysteresis loop is from negative saturation —S across the hysteresis loop to the positive or front side and up along the positive or front side of the loop toward positive saturation +S as indicated by the arrows. If the volt-time integral of the voltage pulse (volt-seconds) is sufficient to change the flux level in the core 13 of the magnetic amplifier 10 toward positive saturation to a point $\phi_2$ on the positive side of the hysteresis loop, but not drive the core into saturation, the impedance of the test and reference windings 11 and 12 will not change appreciably. Thus, substantially all of the voltage pulse induced in the transformer secondary winding 18 in the reference circuit is utilized to change the flux level in the core member 13 and the net voltage across the series combination of the transformer secondary winding 15 and the test winding 11 is zero.

The flux change in the core member 13 due to the voltage pulse in the test circuit induces a voltage across the reference winding 12 (by transformer action) which is equal in magnitude to the voltage pulse across the test winding 11 and of a polarity to resist the change of flux taking place. Consider the voltage wave of curve B of Figure 5 to be the same as the voltage which appears across the test winding 11. If this is the case, the voltage wave illustrated by curve B of Figure 5 represents the induced voltage across the monitoring winding 11.

If the voltage pulse introduced into the reference circuit by secondary winding 18 of the pulse power supply transformer 16 has the same wave shape and polarity as the square wave voltage represented by curve A, each voltage pulse introduced into the reference circuit from the transformer 16 is opposed by an equal and opposite voltage pulse induced in the reference winding 12. Thus, the net voltage across the series combination of the reference winding 12 and transformer secondary winding 18; i.e., between terminals 1 and 2, is also zero. After the occurrence of each voltage pulse, the flux in the core member 13 is reduced until the original flux level (at negative saturation —S, Figure 3) is restored. This is true since the magnetizing force applied due to the pulse voltage is removed and the net unidirectional differential volt-seconds applied to the core member 13 by the test and monitored cells 17 and 9 is negative.

If the voltage across the monitored battery cell 9 decreases below the selected reference level, the net unidirectional differential magnetizing force applied to the core member 13 is reduced. Since the volt-seconds which swing the flux toward negative saturation (between positive pulses) is reduced, the flux level in the core is not returned to negative saturation before the application of another positive pulse but is only driven down the back side of the hysteresis loop to some point such as point $\phi_3$ (Figure 4). Since the flux level of the core is above negative saturation when the next positive pulse occurs, it takes fewer volt-seconds to drive the core into positive saturation. Therefore, if the voltage of the monitored cell 9 drops below the selected reference level, the volt-seconds applied to the core member 13 by the next voltage pulse in the monitoring circuit drives the core into saturation and thereby reduces the impedance of the reference winding 12 to a very low value.

This action may be understood by referring to the hysteresis loop of Figure 4 and starting from the point of operation on the back side of the hysteresis loop $\phi_3$. The application of a positive pulse provides a magnetizing force which moves the operation of the core across to the front side of the hysteresis loop and swings the flux level of the core member into positive saturation +S. For a given differential volt-seconds as applied by the test and standard cells 9 and 17 the steady state operation on the major hysteresis loop will be represented by some minor loop wherein the negative volt-seconds applied between pulses is just equal to the positive volt-seconds applied. For example, the minor loop which may be traced from point $\phi_4$ on the back side of the hysteresis loop across to the front up into positive saturation and back down along the back side of the loop to the point $\phi_4$.

When the core member 13 is saturated, the voltage pulse introduced in the test circuit is no longer utilized to increase the flux level in the core member 13. The impedance of the test winding 11 is thus effectively reduced and the remainder of the voltage pulse (after saturation of the core member) introduced into the test circuit appears across the series combination of the test winding 11 and transformer secondary winding 15.

Once the core member 13 becomes saturated, the transformer action no longer takes place due to the fact that the flux level in the core ceases to change. Therefore, the induced voltage which appears across the reference winding 12 does not last for the full period of the voltage pulse introduced into the monitoring circuit by means of the transformer secondary winding 18. The voltage wave illustrated in Figure 5C represents the voltage induced across the reference winding 12 when the core member 13 is driven into saturation. The broken lines designated +S, which coincide with the back side of the square wave of Figure 5C, illustrate that the voltage across the reference winding 12 drops off immediately upon the occurrence of saturation (this also means that the impedance of the winding 12 drops to substantially zero upon positive saturation of core member 13).

If once again we consider the voltage wave illustrated by curve A of Fig. 5 to be that which is induced across the secondary winding 18 of the supply transformer 16, then the voltage wave of curves A and C of Figure 5 may be compared to obtain the net voltage which appears across the series combination of the transformer secondary winding 18 and reference winding 12; i.e., the voltage which appears between terminals 1 and 2. The voltage wave of Figure 5D illustrates the difference between these two voltage. An inspection of this figure shows that upon saturation of the core 13 a voltage spike appears between the terminals 1 and 2. Since the circuit parameters are adjusted so that saturation occurs only when the voltage of monitored cell 9 is lower than the predetermined desired value, the voltage spike between terminals 1 and 2 occurs only upon such an under voltage condition.

For the sake of discussion, the difference in voltage across the test winding 11 which is required to produce a detectable output voltage between the points 1 and 2 is referred to as the error voltage. The interval following a pulse in which the flux in the core 13 is returned to its original value (i.e., steady state value) is referred to as the reset period. This reset period contains the same number of volt-seconds as the voltage pulse. That is to say, that a unidirectional voltage must be applied across the test and reference windings 11 and 12 during the reset period which is of such a magnitude that the integral of the voltage over the reset time is equal to the volt-second in the pulse which changed the flux level in the core member 13 toward positive saturation.

For the condition described where the core was driven into positive saturation (see Figure 4), this reset voltage provides a magnetizing force to move the operation of the core down from positive saturation $+S$ along the back side of the hysteresis loop to the point $\phi_3$. For the condition illustrated in Figure 3 where the core was not driven into positive saturation but driven to point $\phi_2$ below positive saturation $+S$ on the positive side of the hysteresis loop, the reset voltage provides a magnetizing force to drive the core back across hysteresis loop and down the back side of the loop to the initial flux level $-S$ as indicated by the arrows. Since the applied voltage pulses contain the same number of volt-seconds regardless of the point of operation on the hysteresis loop, the reset of the core is accomplished by the same number of volt-seconds regardless of the point of operation on the hysteresis loop.

The resetting operation can be performed by the combined effect of the voltage induced in the monitoring circuit by the supply transformer secondary winding 15 between positive pulses and the error voltage, or substantially either one alone. The factors on which this depends are length of reset period relative to length of pulse, resistance of the circuit which supplies the pulse, the width of the hysteresis loop of the core material 13, and the magnitude of the error voltage. However, in an ideal combination of these factors, the maximum volt-time integral which the output spike Figure 5D contains is equal to the product of the error voltage and the reset time.

From the above discussion it may be seen that the only requirement with regard to the duration of the applied pulses is that a sufficient period of time be provided between pulses to permit the reset of the core member 13. Satisfactory results were obtained utilizing 60 cycle pulses of 160 volts with a duration or pulse width of 300 microseconds.

In order to provide an indication of a low voltage on the battery cell 9, a glow lamp 8, such as a neon lamp, is provided. This lamp is connected in series with a rectifier 26 and the combination is connected across the secondary winding 25 of matching transformer 20. To make the indication more noticeable, a capacitor 27 is connected in parallel with the indicator lamp 8 and a blocking layer rectifier 26 is connected in series with this combination. Each time a voltage spike appears across the series combination of the reference winding 12 and the secondary winding 18 of the pulse supply transformer; i.e., between terminals 1 and 2, a voltage is applied to the primary winding 19 of the matching transformer 20. Consequently, a voltage pulse is induced in the secondary winding 25 which is applied across the capacitor 27. When the voltage on the capacitor 27 builds up to the ignition point on the neon lamp 8, a flash is produced. The blocking rectifier 26 is utilized to prevent discharge of capacitor 27 through the matching transformer secondary winding.

The previous discussion implies that the circuit would have a snap action or snap characteristic; i.e., that there would be either no voltage on the neon lamp or a unidirectional voltage equal to the magnitude of the pulse voltage. However, the system cannot have a snap characteristic unless the voltage pulses introduced into the monitoring and reference circuits have perfectly vertical sides. The sides of such pulses almost invariably have some slope and therefore if the gain of the circuit is to approach infinite gain (full off to full on) a special arrangement must be used. To illustrate the condition wherein the voltage pulses do not have perfectly vertical sides reference is made to the pulse illustrated in curve E of Figure 5 wherein the slope of the sides of the pulses is exaggerated for purposes of illustration. As was previously described, the remainder of the applied voltage pulse (see curve F of Figure 5) which appears after the core member 13 is driven into positive saturation $+S$ appears between the output terminals 1 and 2 and is utilized to light the lamp. However, as may be seen from curves E and F of Figure 5, if positive saturation of the core occurs near the end of the applied voltage pulse (i.e., if the voltage difference between the reference voltage source and the monitored voltage source is such that differential volt-seconds applied to the core between pulses changes only a very small amount) the magnitude of the voltage which appears between the output terminals 1 and 2 is extremely small. The voltage required to light the lamp 8 is a function of the firing voltage for the particular lamp used and although the capacitor 27 charges up to a value determined by the peak value of the output voltage spike the voltage may not actually be high enough to ignite the lamp. From this discussion it is seen that a greater circuit sensitivity is desired and that the core member 13 would have to saturate fairly early during the applied pulse in order to obtain a full output voltage across the output terminals 1 and 2.

In order to provide the snap characteristic desired, a core material is used for the core member 13 which has a special dynamic hysteresis loop. Such loops are illustrated in Figure 7. The characteristic which gives the circuit the snap action is what has been described as a "bulge" or "ear" at the upper left along the upper portion of the back side of the hysteresis loop. This bulge in this position means that the loop is wider across the top than at the central portion (the zero flux density axis) or, in other words, the back side of the dynamic hysteresis loop is re-entrant.

A number of materials which have the desired characteristics and which can be used with the circuit to obtain the snap characteristic are known and commercially available. For example, the magnetic core material which goes under the trade name Deltamax and which is manufactured by Arnold Engineering Company, Marengo, Illinois, is one such material. The Arnold Bulletin TC–101A, March 1953, entitled "Properties of Deltamax 4–79 MO-Permalloy Supermalloy" describes this material as a grain oriented 50% nickel-iron alloy. The core material which goes under the trade name of Orthonol and which is a grain oriented 50% nickel-iron alloy has also been found to be satisfactory. This material is manufactured by Magnetics, Inc., of Butler, Pa. The Magnetics, Inc., catalog TWC–100 indicates that a material commercially known as 48 Alloy, a random grain structure consisting of 48% nickel and 50% iron; and the material commercially known as Magnesil, a grain oriented structure consisting of 97% iron and 3% silicon exhibit the necessary "hump" on the back side of the hysteresis loop. There are, undoubtedly, other core materials which have hysteresis loops with a re-entrant back side and which may be used for the present application that are not known to the inventors at the present time.

In order to explain the action of the particular circuit utilizing a core member 13 of a desired hysteresis loop, a somewhat exaggerated loop is illustrated in Figure 7 and curve A of Figure 6 illustrates a pulse wave form with numerals positioned to correspond to points of operation on the hysteresis loop of Figure 7.

Refer specifically to curve A of Figure 6 and Figure 7 and assume that the relationship between the voltage of the monitored cell 9 and the reference voltage source 17 is such that the differential unidirectional volt-seconds applied to the core member by the reference and test windings 11 and 12 drives the core into negative saturation $-S$ between applied pulses. Also assume that the positive pulse volt-seconds swings the core flux position by an amount $\phi_M$. Under these conditions, the operation of the core will be around the loop as follows: From negative saturation —S in the positive direction to the right along the bottom of the loop to a point $a$ as the net magnetizing force becomes zero then to point $b$ and up along the front of the loop to the zero flux density axis at the point $c$. As the applied pulse drops to zero, operation of the core moves back along the zero flux density axis to the zero magnetizing force axis to point $d$, at which time the unidirectional volt-seconds caused by the potential difference between the reference voltage source and the monitored voltage source furnishes a negative magnetizing force which drives the core further back along the zero flux density axis to the back side of the hysteresis loop at point $e$ and down to the back side of the loop to the negative saturation point —S. The occurrence of the next pulse causes the material to move around the loop just described once more. Actually, the point —S on the hysteresis loop may be somewhere out in the negative saturation region but this saturation of the core does not produce an output voltage between the output terminals 1 and 2 since there must be a pulse applied to get an appreciable output voltage.

Until the relationship of the voltages of the monitored cell 9 and the reference cell 17 changes, the circuit continues to operate on the minor loop just described. However, if the voltage across the test cell 9 decreases, the minor loop around which the core operates changes until it is operated on a minor loop which is at the top of the dynamic hysteresis loop and a voltage appears across the output terminals 1 and 2 and is explained in detail below.

If the voltage on the test cell 9 is reduced slightly the ampere turns which drive the core toward negative saturation decrease and, therefore, instead of the core being returned to negative saturation between positive pulses, the core is only driven across to the back side of the hysteresis loop and down to some point, such as the point $f$, before the occurrence of another positive pulse. Upon the occurrence of another positive pulse, the operating point moves across to the front side of the loop to point $g$ (see the horizontal dotted line) and up the front side by a distance $\phi_{M2}$ (equal to $\phi_M$) to point $h$ at which time the positive pulse voltage becomes zero and the negative swing starts again. Once again, the negative flux swing is just sufficient to drive the core across the loop and down the back side of the hysteresis loop a distance equal to the distance $ef$ to point $k$ before another positive pulse occurs and drives the core back across to the front side of the loop (see the horizontal dot dash line) and up the front side to point $m$ (another distance $\phi_{M3}$). Thus, the positive pulse continues to swing the flux up the loop by the same amount but the negative pulse does not swing the flux as far down the loop. As a consequence, on subsequent pulses the core works its way from the bottom minor loop —S $abcde$ to the top minor loop $vwxyz$. This appears as a snap since it takes place in only a few cycles. In this manner it is seen that a minute drop in test cell voltage below the desired level causes the operation to move from one minor lop to another "climbing" the dynamic hysteresis loop until the core moves into positive saturation +S and is operated around a minor hysteresis loop such as $vwxyz$.

The transfer from the bottom to the top of the dynamic loop is still not the cause of the circuit snap characteristic. The snap characteristic is a direct result of the bulge at the top of the loop. If the loop had straight sides as illustrated in the loops of Figures 3 and 4, the operation of the core still transfers from the bottom to the top of the dynamic loop in a manner similar to that just described if the difference voltage between that of the test cell and that of the reference source changes by only a very slight amount. However, as is illustrated by the small triangular shaped voltage spike illustrated by curve F of Figure 5, the voltage output of the circuit utilizing the square loop material is very small. Where the core member used has a dynamic loop with the "bulge" on the back side at the top, the core is driven farther into saturation during the positive pulse. This is due to the fact that the given magnetizing force supplied by the error voltage cannot drive the flux as far down the back side of the hysteresis loop when operation of the core is at the top and the hysteresis loop of the material has the bulge thereon as it would if the material were characterized by a perfectly square loop. That is to say, that more exciting current is required for the negative flux swing at the top of the loop due to the increased width of the hysteresis loop. Since more exciting current is required, more of the direct current difference voltage appears as a drop across the circuit resistance because of the higher exciting current. This amplifies the effect of the slight voltage drop across the monitored cell. Consequently, the core is driven even farther into saturation during the positive pulse period until a steady state condition is reached. The operation of the core is around the top minor loop $vwxyz$ and less negative flux swing $\phi_{Min}$ occurs than at any other point of operation on the loop. Since the core is driven further into positive saturation due to the "ear" on the back of the hysteresis loop, a voltage spike, such as the one illustrated by curve B of Figure 6, appears between the output terminals 1 and 2. This voltage spike is of a much greater magnitude than the small triangular pulse which would occur if the top of the hysteresis loop were not wider than the rest of the loop, for example, compare the voltage spike of curve B of Figure 6 with that of curve F of Figure 5.

From the above discussion it is obvious that to obtain the snap characteristic two conditions are required. First, the core material must be such that it has a bulge on the top left portion of the hysteresis loop and second, the flux swing produced by the positive pulse must be less than twice the value of $\phi_M$. If flux swing were more than twice the value of $\phi_M$, the core would operate over the entire dynamic hysteresis loop and there could not be a snap from one minor loop to another.

By providing the reference winding 12 of the magnetic amplifier 10 with the proper number of turns; i.e., by proper impedance matching, the impedance matching transformer 20 may be eliminated altogether; in which case the rectifier-capacitor-lamp combination may be connected directly between the terminals 1 and 2. Such a circuit arrangement is illustrated in Figure 2.

Since the circuit of Figure 2 operates on the same principle as described with respect to the circuit of Figure 1 and the components of the circuits are identical, the corresponding components are given identical reference numerals except for the rectifier-capacitor-lamp combination. The rectifier-capacitor-lamp combination is connected in a different manner and therefore these elements are given new reference numerals. Referring specifically to the circuit of Figure 2, the rectifier 30 is connected in series with the capacitor 31 and this series combination is directed directly between the output terminals 1 and 2. The lamp 32 is connected in series with a resistor 33 and this series combination is connected directly across a capacitor 31. The rectifier 30, capacitor 31, and resistor 33 are used to filter the voltage applied to the lamp 32. When a pulse of voltage appears between the output terminals 1 and 2, the capacitor 31 is charged to the peak voltage of the pulse. Therefore, a substantially unidirectional voltage is always delivered to the neon lamp in steady state if the lamp series resistor 33 is high. Even if the lamp 32 does fire, the resistor 33 prevents the capacitor from discharging appreciably during the time between pulses.

The action of the circuit of Figures 1 and 2 have been described with regard to indicating an under voltage on the monitored cell 9; it is to be particularly understood that the circuits may be used equally well to indicate an over voltage. For instance, to indicate an over voltage across the monitored cell 9, the pulse introduced into the monitoring circuit would normally be in a direction to aid rather than oppose the current in the monitoring winding 11 and the magnetizing force applied by the monitoring winding 11 would normally be made less, rather than greater, than the magnetizing force applied by the reference winding 12. Since the above discussion establishes that the circuits may be utilized to indicate either an under or an over voltage condition, it becomes obvious that they may also be made to indicate when two voltages are equal. It is equally obvious that the voltage spike which occurs upon the occurrence of the monitored condition may be utilized for purposes other than operating a glow lamp. For example, it may be utilized to operate an alarm, a relay, or control circuit.

Another point which should be borne in mind is the fact that the indicating means described above in connection with the circuits of Figures 1 and 2 may be used equally well in conjunction with either the monitored circuit or the reference circuit. This is so for the reason that the operating parameter for the indicating circuits is a voltage spike caused by the occurrence of the condition being monitored. As described above, the voltage spike which occurs in the reference circuit across the series combination of the voltage pulse supplying transformer secondary winding 18 and the reference winding 12 of the magnetic amplifier 10 is utilized to operate the indicators of Figures 1 and 2. However, the description of operation above points out that a corresponding voltage spike occurs across the series combination of the pulse supplying transformer secondary winding 15 and the monitoring winding 11 in the monitoring circuit. This voltage spike may also be used to operate indicators, relays or other control devices.

While particular embodiments of this invention have been shown it will, of course, be understood that the invention is not limited thereto since many modifications both in the circuit arrangement and in the instrumentalities employed may be made. It is contemplated that the appended claims will cover any such modifications as fall within the true spirit and scope of this invention.

What we claim as new and desire to secure by Letters Patent of the United States is:

1. Voltage monitoring apparatus for determining a condition of a monitored voltage source relative to a reference voltage source including a saturable core impedance device having a monitoring winding and a reference winding on a saturable magnetic core member, a monitoring circuit including said monitoring winding conected to be energized by the monitored voltage source whereby said monitoring winding applies a magnetizing force to said core member in one sense, a reference circuit including said reference winding connected to be energized by the reference voltage source whereby said reference winding applies a magnetizing force to said core member in a sense opposite to that applied by said monitoring winding, said saturable core member consisting of a material which has a dynamic hysteresis loop with a re-entrant back side so that repeated equal magnetizing and demagnetizing forces provide increased residual magnetization and more exciting current flows in the reference winding during application of demagnetizing forces, and means to introduce voltage pulses into each of said circuits simultaneously which pulses are of a polarity to cause each of said windings to apply magnetizing forces to said core member of the same sense to determine a relative condition of the voltage sources.

2. In a voltage monitoring apparatus for determining a condition of a monitored voltage source relative to a reference voltage source, a saturable core impedance device having a reference winding, a monitoring winding, and a saturable core member which has a dynamic hysteresis loop with a re-entrant back side so that repeated equal magnetizing and demagnetizing forces provide increased residual magnetization and more exciting current flows in the reference winding during application of demagnetizing forces, said reference and monitoring windings being connected to be energized by the reference and monitored voltage sources respectively whereby said core member receives the differential of the magnetizing forces produced by said windings; and means to apply a voltage pulse to each of said windings which pulses are of a polarity to cause the application of additive magnetizing forces to said core member by said windings and of a magnitude which is not great enough to cause the core to operate on its major hysteresis loop whereby the degree of magnetization of said core member may be determined.

3. In a voltage monitoring apparatus for determining a condition of a monitored voltage source relative to a reference voltage source, a saturable core impedance device having a saturable magnetic core member, a reference winding, and a monitoring winding, said saturable core member consisting of a material which has a dynamic hysteresis loop with a re-entrant back side so that repeated equal magnetizing and demagnetizing forces provide increased residual magnetization and more exciting current flows in the reference winding during application of demagnetizing forces, said reference and monitoring windings being connected to be energized by the reference and monitored voltage sources respectively whereby said core member receives the differential of the magnetizing forces produced by said windings, means to introduce a voltage pulse into each of said windings which pulses are of a polarity to cause the application of additive magnetizing forces to said core member by said windings, and means connected in circuit relationship with at least one of said reference and monitoring windings to determine any differential between the voltage pulse applied to said winding and the voltage drop across said winding due to said voltage pulse.

4. In a voltage monitoring apparatus for determining a condition of a monitored voltage source relative to a reference voltage source, a saturable core impedance device having a saturable magnetic core member, a reference winding, and a monitoring winding, said saturable core member consisting of a material which has a dynamic hysteresis loop with a re-entrant back side so that repeated equal magnetizing and demagnetizing forces provide increased residual magnetization and more exciting current flows in the reference winding during application of demagnetizing forces, said reference and monitoring windings being connected to be energized by the reference and monitored voltage sources respectively whereby said core member receives the differential of the magnetizing forces produced by said windings, means to introduce a voltage pulse into each of said windings which pulses are of a polarity to cause the application of additive magnetizing forces to said core member by said windings, and of a magnitude which is not great enough to cause the core to operate on its major hysteresis loop, and means connected in circuit relationship with at least one of said reference and monitoring windings to determine any differential between the voltage pulse applied to said winding and the voltage drop across said winding due to said voltage pulse.

5. In a voltage monitoring apparatus for determining a condition of a monitored voltage source relative to a reference voltage source, a saturable core impedance device having a saturable magnetic core member, a reference winding, and a monitoring winding, said saturable core member consisting of a material which has a dynamic hysteresis loop with a re-entrant back side so that repeated equal magnetizing and demagnetizing forces provide increased residual magnetization and more exciting current flows in the reference winding during application of demagnetizing forces, said reference and monitoring windings being connected to be energized by the reference and monitored voltage sources respectively whereby said core member receives the differential of the magnetizing forces produced by said windings, means to introduce a voltage pulse into each of said windings which pulses are of a polarity to cause the application of additive magnetizing forces to said core member by said windings, means connected in series circuit relationship with at least one of said reference and monitoring windings to develop a voltage which is a function of the differential between the voltage pulse applied to said winding and the voltage drop across said winding due to said voltage pulse, and indicating means connected to be responsive to such developed voltage.

6. In a voltage monitoring apparatus for determining a condition of a monitored voltage source relative to a reference voltage source, a saturable core impedance device having a reference winding, a monitoring winding, and a saturable core member which has a dynamic hysteresis loop with a re-entrant back side so that repeated equal magnetizing and demagnetizing forces provide increased residual magnetization and more exciting current flows in the reference winding during application of demagnetizing forces, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, and means connected in circuit relationship with at least one of said reference and monitoring windings to determine any differential between the voltage pulse supplied and the voltage drop across said winding due to said voltage pulse.

7. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said saturable core member consisting of a material which has a dynamic hysteresis loop with a re-entrant back side so that repeated equal magnetizing and demagnetizing forces provide increased residual magnetization and more exciting current flows in the reference winding during application of demagnetizing forces, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, said magnetizing forces applied to said core member being such that the operation of the core is on a minor dynamic hysteresis loop, and means connected in series circuit relationship with at least one of said reference and monitoring windings to develop any differential between the voltage pulse supplied to the circuit of said winding and the voltage drop across said winding due to said voltage pulse.

8. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said saturable core member consisting of a material which has a dynamic hysteresis loop with a re-entrant back side so that repeated equal magnetizing and demagnetizing forces provide increased residual magnetization and more exciting current flows in the reference winding during application of demagnetizing forces, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, and means connected across the series combination of at least one of said reference and monitoring windings and the associated voltage pulse supply means to determine any differential between the voltage pulse supplied and the voltage drop across said winding due to said voltage pulse.

9. In a voltage monitoring apparatus for determining a condition of a monitored voltage source relative to a reference voltage source, a saturable core impedance device, a reference winding having a monitoring winding, and a saturable core member which has a dynamic hysteresis loop with a re-entrant back side so that repeated equal magnetizing and demagnetizing forces provide increased residual magnetization and more exciting current flows in the reference winding during application of demagnetizing forces, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, said magnetizing forces applied to said core member being such that the operation of the core is of a minor dynamic hysteresis loop, and means including a glow lamp connected across the series combination of at least one of said reference and monitoring windings and the associated voltage pulse supply means whereby any differential between the voltage pulse supplied and the voltage drop across said winding due to said voltage pulse ignites said glow lamp.

References Cited in the file of this patent

UNITED STATES PATENTS

| | | |
|---|---|---|
| 2,725,520 | Woodworth | Nov. 29, 1955 |
| 2,752,510 | Hall | June 26, 1956 |